United States Patent [19]

Bell

[11] Patent Number: 4,579,387
[45] Date of Patent: Apr. 1, 1986

[54] MOTOR VEHICLE SEAT HINGE

[75] Inventor: Robert L. Bell, Oxford, Mich.

[73] Assignee: Fisher Dynamics Corporation, St. Clair Shores, Mich.

[21] Appl. No.: 589,229

[22] Filed: Mar. 14, 1984

[51] Int. Cl.[4] .......................... A47C 1/025; B60N 1/04
[52] U.S. Cl. ..................................... 297/379; 297/216
[58] Field of Search ................ 297/379, 219, 366, 367

[56] References Cited

U.S. PATENT DOCUMENTS

| | | | |
|---|---|---|---|
| 2,828,806 | 4/1958 | Saffer | 297/379 |
| 3,481,646 | 12/1969 | Tabor | |
| 3,632,168 | 1/1972 | Barello | 297/379 |
| 3,674,309 | 7/1972 | Fowler | 297/379 |
| 3,746,389 | 7/1973 | Fourrey | 297/379 |
| 3,848,923 | 11/1974 | Dehler | |
| 4,103,967 | 8/1978 | Tanaka et al. | 297/379 |
| 4,147,386 | 4/1979 | Stolper | |
| 4,165,128 | 8/1979 | Strowick et al. | |
| 4,223,946 | 9/1980 | Kluting | |
| 4,252,370 | 2/1981 | Kluting et al. | |
| 4,279,442 | 7/1981 | Bell | 297/367 |
| 4,294,488 | 10/1981 | Pickles | |
| 4,295,682 | 10/1981 | Kluting et al. | |
| 4,305,615 | 12/1981 | Osterhold | |
| 4,332,418 | 6/1982 | Strowik | |
| 4,358,155 | 11/1982 | Osterhold et al. | |
| 4,365,837 | 12/1982 | Mizelle | |
| 4,365,838 | 12/1982 | Berg | |
| 4,366,984 | 1/1983 | Kluting et al. | |
| 4,382,630 | 5/1983 | Weston | 297/379 |
| 4,429,919 | 2/1984 | Kluting et al. | 297/379 |
| 4,438,974 | 3/1984 | Kresky et al. | 297/379 |

Primary Examiner—William E. Lyddane
Assistant Examiner—Mark W. Binder
Attorney, Agent, or Firm—Harness, Dickey & Pierce

[57] ABSTRACT

An improved motor vehicle seat back hinge mechanism which includes an inertial sensitive latching device which prevents forward rotation of the seat back in the event of sudden vehicle deceleration. The vehicle seat hinge mechanism according to this invention improves over prior art designs by providing a quadrant component which does not present objectionable rearward protrusions which interfere with rear seat occupants while entering and egressing from the rear seat area and, further, avoids the presentation of sharp projections which could cause tearing and wearing of interior trim fabrics. Further, the pendulum type inertial sensing mechanism of the design according to this invention avoids the use of loose parts which may give rise to noise and rattle problems associated with rolling weight type inertial sensing mechanisms.

5 Claims, 5 Drawing Figures

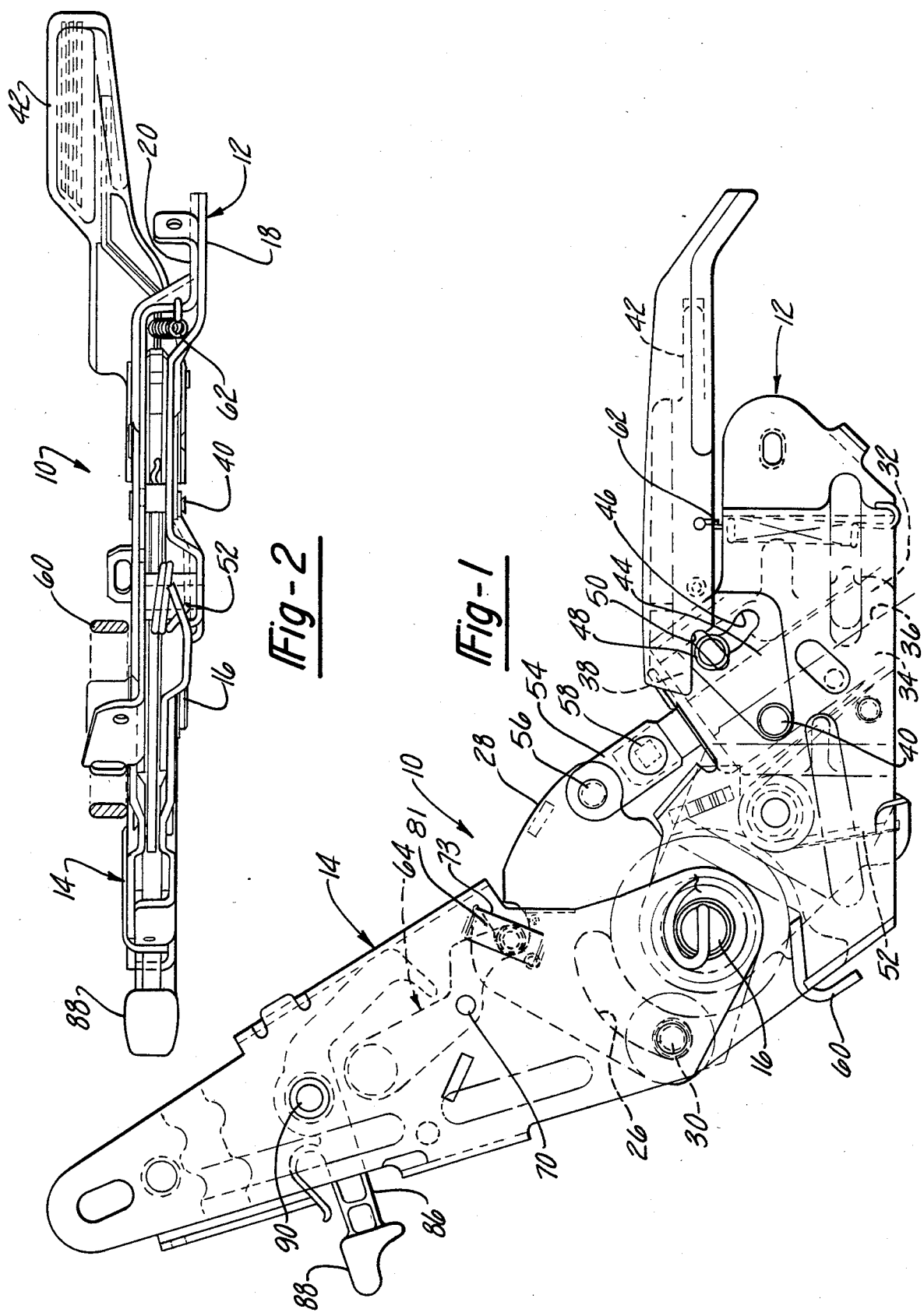

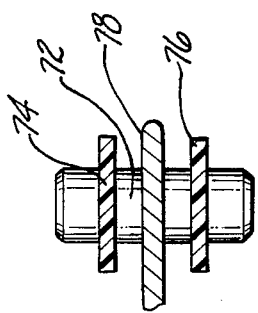
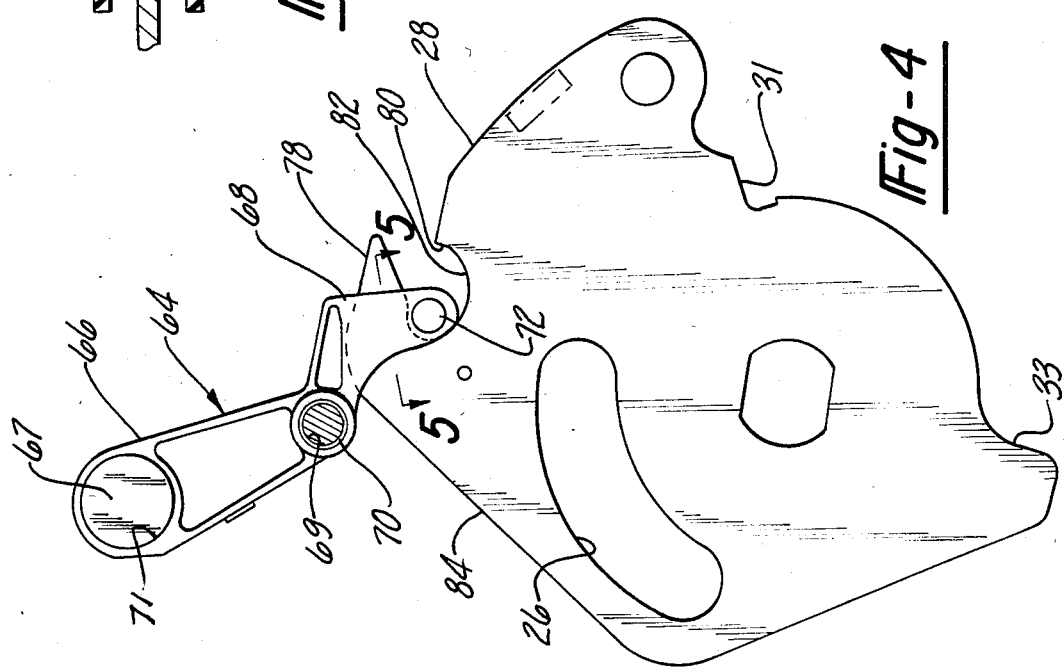
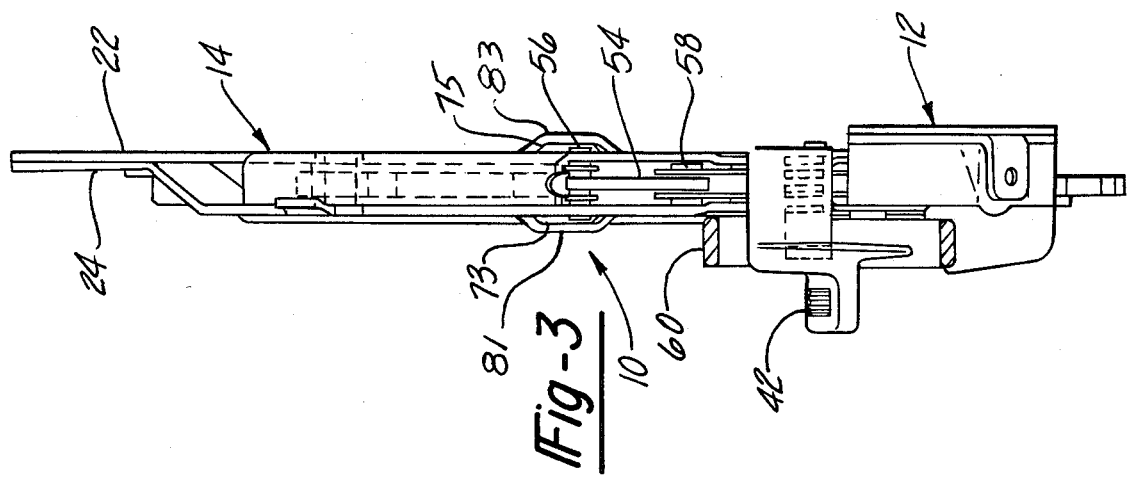

MOTOR VEHICLE SEAT HINGE

BACKGROUND AND SUMMARY OF THE INVENTION

This invention relates to a seat hinge, and more particularly, to a seat hinge structure for a motor vehicle employing an internal inertia sensitive element which prevents articulation of the hinge in certain conditions.

Passenger cars having two side doors and a rear occupant seating area generally must be provided with a mechanism which permits the front seat back to be rotated forward, thereby providing sufficient clearance for access to the rear seating area, and to permit entrance to and egress from the rear seating area by passengers. In the past, manually operated hinge mechanisms were prevalent. These devices required the passenger to manually actuate a lever or other mechanism in order to unlatch the seat back, thereby allowing it to be swung forward. Latching mechanisms are necessary in order to comply with Federal Motor Vehicle Safety Standards (FMVSS) which require that the front seat back be held in a nearly vertical position when the vehicle is subjected to sudden deceleration, as would be experienced during a frontal impact. The intent of these requirements is to prevent the seat back from striking the front seat occupants in such conditions. In an effort to improve comfort and convenience of motor vehicles, manufacturers have recently provided inertia sensitive seat back hinge mechanisms. These devices employ an internal inertia sensitive element which, when subjected to high rates of deceleration, causes the seat back to be locked, thereby preventing it from moving forward due to the force of such deceleration. Under normal circumstances, however, the rear seat passenger may simply push the front seat back forward without first actuating a release lever.

An additional customer feature which is being provided in modern motor vehicles in increasing numbers are reclining devices which permit the angle of the front seat back relative to the seat bottom to be changed in accordance with the desires of the seat occupant.

Many seat back hinge mechanisms having an inertia sensitive latch and a reclining feature have been heretofore proposed and implemented. One such design, which is described by U.S. Pat. No. 4,372,610, issued on Feb. 8, 1983, to A. J. Fisher III, et al, which is assigned to the assignee of this application, employs a quadrant attached to the lower hinge structure and features an internal arcuate aperture through which a pin affixed to the upper hinge structure passes as the seat back is moved between normal and forward positions. The quadrant according to the previously mentioned patent, however, presents a protruding edge surface toward the rear seat area when the seat back is rotated forward. This edge surface is objectionable in that rear seat occupants could contact it while entering or egressing the rear seat area. This edge surface also prevents the application of interior trim fabrics over this area due to the potential for wearing or tearing of the trim.

The design according to the previously cited U.S. patent also includes a rolling weight type inertia sensor. This sensor employs a disc shaped element which rolls along an enclosed path when subjected to deceleration forces. Motor vehicle manufacturers, however, desire to avoid such rolling weight inertia sensors since they believe that these devices may be a source of noise and rattle problems as the vehicle is subjcted to road induced vibrations.

It is therefore a principal object of this invention to provide an improved motor vehicle seat hinge structure having a quadrant component which does not present an objectional protruding edge surface to rear seat occupants when the front seat is moved forward. It is another principal object of this invention to provide an inertia sensor device which does not employ a rolling weight.

Additional benefits and advantages of the present invention will become apparent to those skilled in the art to which this invention relates upon a reading of the described preferred embodiments of this invention taken in conjunction with the accompanying drawings.

BRIEF DESCRIPTION OF THE DRAWINGS

FIG. 1 is a side elevational view of the seat hinge mechanism according to the teachings of the present invention.

FIG. 2 is a plan view of the hinge mechanism shown by FIG. 1.

FIG. 3 is a front view of the seat hinge mechanism shown by FIG. 1.

FIG. 4 is a partial cutaway view showing the inertia locking mechanism according to the present invention.

FIG. 5 is a sectional view taken along line 5—5 of FIG. 4 showing details of the configuration of the actuator according to this invention.

DETAILED DESCRIPTION OF THE INVENTION

References to rearward and forward directions contained within this document are made with reference to the motor vehicle with which the invention is preferably employed. Decelerations are defined as being caused by loads exerted on the vehicle in a direction to oppose forward motion of the vehicle.

The motor vehicle seat hinge mechanism according to this invention is shown completely assembled in FIGS. 1, 2 and 3 and is generally designated by reference character 10. The embodiment of hinge 10 described herein by the accompanying figures is intended to be positioned at the left-hand side of a driver's seat. A hinge structure useful for a front passenger seat would employ components which are mirror image replications of those described herein. Hinge 10 includes a lower hinge structure 12 which is attached to the seat bottom frame (not shown). Upper hinge structure 14 is attached to the seat back frame (not shown) and is adapted to pivot with respect to lower structure 12 about pivot pin 16. Lower hinge structure 12 is formed by attaching two plates, inner lower hinge plate 18 and outer lower hinge plate 20. These plates are attached together by rivets and are formed to define a space therebetween within which the additional components, which will hereinafter be described, are disposed. The hinge upper structure 14 is similarly formed by attaching two plates, inner upper hinge plate 22 and outer upper hinge plate 24. These plates are also formed to define a space therebetween. The degree of angular motion of upper hinge structure 14 with respect to lower hinge structure 12 and therefore between the seat back and bottom is defined by the angular extent of slot 26 within quadrant 28. Pin 30, which is affixed to upper hinge structure 14, moves within slot 26 as the upper hinge structure is rotated with respect to lower hinge structure 12 about pivot pin 16.

Although not necessary for the successful practice of this invention, seat hinge 10 includes a recliner mechanism which permits the seat back angle to be adjusted. The position of quadrant 28 with respect to lower hinge structure 12 is controlled by the positioning of recliner arm 32, which is movable linearly with respect to lower hinge structure 12 in order to effect various reclined seat back positions. As recliner arm 32 is positioned at various longitudinal locations, the positioning of quadrant 28 with respect to lower hinge structure 12 is changed by rotation of the quadrant about pivot pin 16, such that the rearward extent of slot 26 is also changed. It is this rearward position of slot 26 that controls the angle of the upper hinge structure with respect to the lower hinge structure 12 and consequently between the seat back and bottom. The range of angular variation in the positioning of quadrant 28 is controlled by stops 31 and 33 formed by the quadrant which interfere with stop surfaces formed by the lower hinge structure.

Variations in longitudinal positioning of recliner arm 32 is achieved by providing the arm with a toothed surface which engages with a toothed surface of pawl 34. The teeth of pawl 34 extend along approximately one-third of the length thereof, the remainder portion having a smooth surface 36. Pawl 34 and recliner arm 32 are biased toward one another by arm clamp 38. Pawl 34 is pivotably attached to lower hinge structure 12 by pin 40. Recliner arm 32 is caused to be selectively clamped or unclamped between pawl 34 and arm clamp 38 by causing the arm clamp to be moved toward or away from pawl 34 in response to actuation of recliner handle 42. Recliner handle 42 includes recliner handle plate 44 which forms cam slot 46 and is also pivotably attached to recliner bottom structure 12. Recliner handle 42 is biased clockwise to the position shown by FIG. 1 by coil spring 62. Pin 48 is attached to arm clamp 38 and moves within elongated slot 50 formed by plates 18 and 20 and elongated cam slot 46 in recliner handle plate 44. Therefore, as recliner handle 42 is moved between the positions shown in FIG. 1 and a position displaced counterclockwise from that shown, the arm clamp is caused to move from a lower position within slot 50 to an upper position within that slot thereby unclamping recliner arm 32. When arm 32 is not being clamped between pawl 34 and arm clamp 38, the toothed portion of the pawl is caused to move away from the toothed portion of arm 32, thereby permitting the angular positioning of quadrant 28 and therefore the seat back position to be changed as desired by the seat occupant. Pawl spring 52 causes the pawl to be rotated to a slight extent in a counterclockwise direction with respect to pivot pin 40, thereby insuring separation of the toothed portions of the pawl and the recliner arm. Recliner arm 32 is attached to quadrant 28 by link 54 and by pins 56 and 58. Adjustment of the position of the seat back is made easier by providing pivot pin spring 60 which engages pivot pin 16 and lower hinge structure 12 and resiliently biases the seat back in a clockwise forward position, with respect to the orientation shown by FIG. 1. Such biasing permits the occupant to easily adjust the seat back positioning while in the vehicle seat simply by raising recliner handle 42 and pushing against the seat back until the desired angular position is obtained, whereupon the recliner handle is returned to its normal position.

In accordance with the instant invention, the inertial sensitive mechanism of vehicle seat hinge 10 principally includes a pendulum-type actuator 64 which interacts with quadrant 28 and responds to vehicle deceleration to prevent forward displacement of the seat back. A detailed view of the configuration and cooperation between these components is best shown with reference to FIG. 4. Actuator 64 includes elongated weighted section 66 and lower engaging portion 68. Weighted section 66 includes a weight 67 impressed into bore 71. Pivot pin 70 is attached to upper hinge structure 14 and passes through bore 69. Pivot pin 70 and bore 69 cooperate to form a low friction bearing permitting free rotation of actuator 64. The actuator is configured such that its centroid of mass (center of gravity) lies above pivot pin 70 so that upon vehicle deceleration, the actuator is caused to rotate in a clockwise direction with respect to the orientation shown by FIG. 1. As best shown in FIG. 5, engaging portion 68 of actuator 64 includes engaging pin 72 which is supported by bores in parallel actuator surfaces 74 and 76. Engaging pin 72 is prevented from being withdrawn from the bores within surfaces 74 and 76 since it is trapped between locally deformed portions 81 and 83 forming slots 73 and 75 within upper hinge plates 22 and 24. Quadrant 28 includes a notched upper portion forming forward directed hook 78 and stop surface 80, with notch 82 therebetween.

With respect to the position of the elements shown by FIG. 4, engaging pin 72 of actuator 64 is normally disposed within notch 82. FIG. 1 depicts the configuration of the components when the vehicle is not subjected to a significant deceleration force. Due to the interaction between engaging pin 72 and hook 78, the actuator is restrained from rotating in a counterclockwise direction, thereby preventing withdrawal of engaging pin 72 from notch 82. This positioning is desired to insure that the actuator is normally in a position to prevent forward movement of the seat back. When upper hinge structure 14 is rotated slightly in the forward direction, engaging pin 72 is permitted to escape from notch 82 which results when actuator 64 rotates counterclockwise due to the placement of its centroid of mass (center of gravity). Such rotation may only occur when the vehicle is not subjected to a high deceleration level. Under deceleration conditions, however, actuator 64 is biased to rotate about pivot pin 70 in a clockwise direction, thereby preventing the engaging pin 72 from escaping from notch 82. Forward movement of the upper hinge structure 14 in this situation is therefore prevented due to engagement of engaging pin 72 with stop surface 80 of quadrant 28 and the edges of slots 73 and 75. Under normal circumstances, when the seat back may be freely rotated forward, upon return to the position shown in FIG. 1, engaging pin 72 is guided into notch 82 by the inside edge of hook 78. The end of hook 78 is preferably rounded to guide the hook between surfaces 74 and 76.

With reference to FIG. 1, when the upper hinge structure is rotated fully forward, surface 84 of quadrant 28, which is presented to the rear seat occupant area, is relatively smooth and nonobtrusive, thereby avoiding problems associated with prior art quadrant configurations. In addition, hazards of tearing or abraiding of the seat trim material are avoided in the event that such trim material is used to enclosed the seat back recliner mechanism. The pendulum type actuator 64 provided by the design described herein is a unitary structure which overcomes perceived rattling problems associated with prior art roller weight type actuators.

An emergency releasing mechanism is provided to enable rear seat occupants to extract themselves from the vehicle in the event of failure of the inertial sensitive components of the seat hinge or in the event that vehicle forward inclination causes the hinge mechanism to latch. Therefore, release actuator 86 is provided having a rearwardly projecting portion 88 which may be manipulated by the rear seat occupants such that release actuator 64 is caused to rotate as in FIG. 4 in a counterclockwise position about pivot pin 70, thereby withdrawing engaging pin 72 from notch 82 and permitting the seat back to be folded forward.

While the above description constitutes the preferred embodiments of the present invention, it will be appreciated that the invention is susceptible to modification, variation and change without departing from the proper scope and fair meaning of the accompanying claims.

I claim:

1. A hinge mechanism for controlling rotation of a motor vehicle seat back with respect to a seat bottom, comprising:

a lower hinge structure adapted to support said seat bottom, an upper hinge structure adapted to support said seat back, a first pivot pin rotatably attaching said lower hinge structure to said upper hinge structure thereby permitting said upper hinge structure to be rotated from a first substantially vertical position to an angularly displaced second forward position, an inertia sensitive pendulum actuator pivotally attached to said upper hinge structure about a second pivot, said actuator rotatable between engaging and disengaging positions, said actuator having an upper weighted section and an engaging arm, said engaging arm carrying an engaging pin and defining a pair of spaced apart and parallel surfaces defining a slot therebetween, a quadrant affixed to said bottom hinge structure forming a stop surface, said stop surface interfering with said engaging pin in response to rotation of said actuator to said engaging position in the event of a level of deceleration of said motor vehicle above a predetermined lever thereby preventing movement of said upper hinge structure from said first to said second position, said quadrant further defining a forward directed projecting tooth, whereby said actuator slot receives said tooth when said recliner is in said first position, said tooth biasing said actuator to said engaging position when said hinge structure is in said first position, said tooth escaping from said notch when said upper hinge structure is moved toward said second position while said vehicle is not subjected to said deceleration above said predetermined level, thereby permitting said upper hinge structure to be moved to said second position.

2. The hinge mechanism according to claim 1, wherein said quadrant forms an arcuate slot, and a third pin is affixed to said upper structure and is disposed in said slot whereby said slot controls the angular extent of relative motion between said upper and said lower hinge structures.

3. The hinge mechanism according to claim 2 wherein said quadrant is rotatable about said first pivot pin and recliner means are provided which enable the angular positioning of said quadrant with respect to said lower hinge structure to be adjusted thereby varying said first upper hinge structure position.

4. The hinge mechanism according to claim 1, wherein said quadrant forms a bore through which said first pivot pin passes, said quadrant further forming a smooth edge surface extending between a point adjacent said first pivot pin to said forward directed tooth.

5. A hinge mechanism for controlling rotation of a motor vehicle seat back with respect to the seat bottom, comprising:

a lower hinge structure adapted to support said seat bottom, an upper hinge structure adapted to support said seat back, a first pivot pin rotatably attaching said lower hinge structure to said upper hinge structure thereby permitting said upper hinge structure to be rotated from a first substantially vertical position to an angularly displaced second forward position, an inertia sensitive pendulum actuator pivotably attached to said upper hinge structure, about a second pivot means, said actuator having a pair of arms, an upper weighted section and an engaging arm, said engaging arm carrying an engaging pin, and defining a par of spaced apart and parallel surfaces defining a slot therebetween, a stop surface, operatively associated with said lower hinge structure, said stop surface interfering with said engaging pin in response to rotation of said actuator in the event of a level of deceleration of said motor vehicle above a predetermined level thereby preventing movement of said upper hinge structure from said first to said second position, said lower hinge structure further defining a forward directed projecting tooth, whereby said actuator slot receives said tooth when said recliner is in said first position biasing said actuator to an engaged position when said hinge structure is in said first position, said actuator engaging means escaping from said notch when said upper hinge structure is moved toward said second position while said vehicle is not subjected to deceleration or when said vehicle deceleration is below said predetermined level, thereby permitting said upper hinge structure to be moved to said second position.

* * * * *